US008230151B2

(12) United States Patent
Hou et al.

(10) Patent No.: US 8,230,151 B2
(45) Date of Patent: Jul. 24, 2012

(54) CONFIGURABLE DATA PORT FOR I2C OR SINGLE-WIRE BROADCAST INTERFACE

(75) Inventors: Zhizhong Hou, Fremont, CA (US); Robert Loren Reay, Mountain View, CA (US); James Herr, San Jose, CA (US)

(73) Assignee: Linear Technology Corporation, Milpitas, CA (US)

( * ) Notice: Subject to any disclaimer, the term of this patent is extended or adjusted under 35 U.S.C. 154(b) by 1839 days.

(21) Appl. No.: 11/102,868

(22) Filed: Apr. 11, 2005

(65) Prior Publication Data

US 2006/0227798 A1 Oct. 12, 2006

(51) Int. Cl.
*G06F 13/40* (2006.01)
*G06F 3/00* (2006.01)

(52) U.S. Cl. ................ 710/307; 710/8; 710/11
(58) Field of Classification Search ............. 710/8, 11, 710/307
See application file for complete search history.

(56) References Cited

U.S. PATENT DOCUMENTS

| 4,514,824 | A | * | 4/1985 | Loskorn et al. | 375/222 |
|---|---|---|---|---|---|
| 5,101,498 | A | * | 3/1992 | Ehlig et al. | 710/316 |
| 5,752,047 | A | * | 5/1998 | Darty et al. | 713/300 |
| 5,798,971 | A | * | 8/1998 | Larsen et al. | 365/189.05 |
| 6,294,848 | B1 | * | 9/2001 | Goodrich, II | 307/147 |
| 6,317,367 | B1 | | 11/2001 | Sample et al. | |
| 6,393,053 | B1 | * | 5/2002 | Maier | 375/224 |
| 6,438,462 | B1 | * | 8/2002 | Hanf et al. | 700/297 |
| 6,940,300 | B1 | * | 9/2005 | Jenkins et al. | 324/770 |
| 6,968,472 | B2 | * | 11/2005 | Fernald | 713/400 |
| 7,093,040 | B1 | * | 8/2006 | Mach | 710/100 |
| 7,095,250 | B1 | * | 8/2006 | Stolitzka et al. | 326/82 |
| 2001/0049766 | A1 | | 12/2001 | Stafford | |
| 2003/0194015 | A1 | * | 10/2003 | Suganuma et al. | 375/257 |
| 2004/0123164 | A1 | * | 6/2004 | Chapuis et al. | 713/300 |
| 2004/0186929 | A1 | * | 9/2004 | Salerno | 710/16 |

FOREIGN PATENT DOCUMENTS

EP 0 619 548 A1 10/1994

OTHER PUBLICATIONS

"Linear Technology LTC4260 Datasheet: Positive High Voltage Hot Swap Controller with I²C Compatible Monitoring." URL: http://www.linear.com/pc/downloadDocum XP-002331724 pp. 1-28.
"The I²C-bus specification Version 2.1." Philips Semiconductors, Product Specification, Jan. 2000, XP002218697 pp. 1-46.
English Translation of a Chinese Office Action, issued in Chinese Patent Application No. CN2005800494388 dated on Feb. 6, 2009.
Chinese Office Action, with English translation, issued in Chinese Patent Application No. CN 2005800494388, mailed Feb. 6, 2009.
English translation of Chinese Office Action issued in Chinese Patent Application No. 2005800494388, mailed Oct. 16, 2009.
Chinese Office Action issued in Chinese Patent Application No. CN 2005800494388 dated Jan. 29, 2010.

* cited by examiner

*Primary Examiner* — Chun-Kuan Lee
*Assistant Examiner* — Farley Abad
(74) *Attorney, Agent, or Firm* — McDermott Will & Emery LLP

(57) ABSTRACT

A device having a signal level different from a signal level of an external device includes an interface, such as an I²C interface, for providing communications with the external device. The interface is configurable to support communications with the external device either via multiple wires or via a single wire.

20 Claims, 3 Drawing Sheets

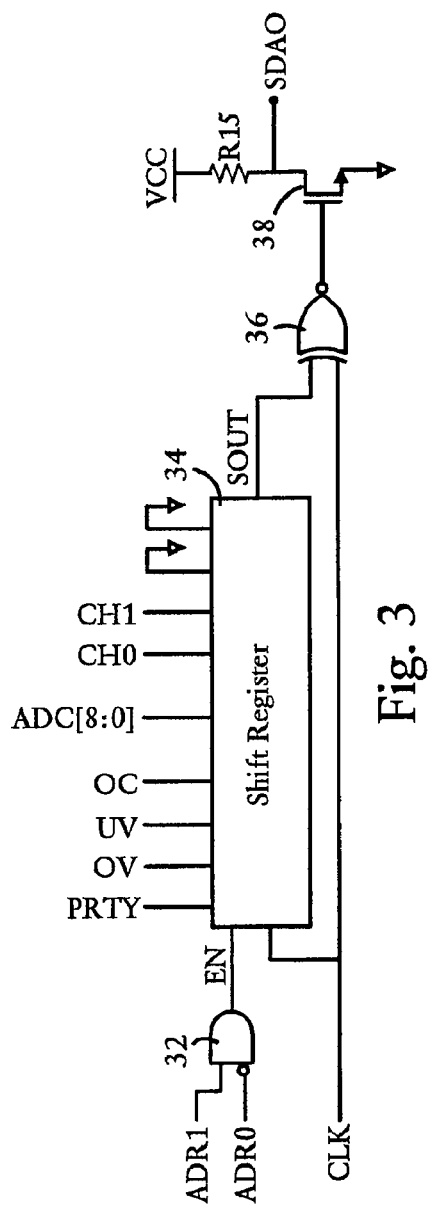
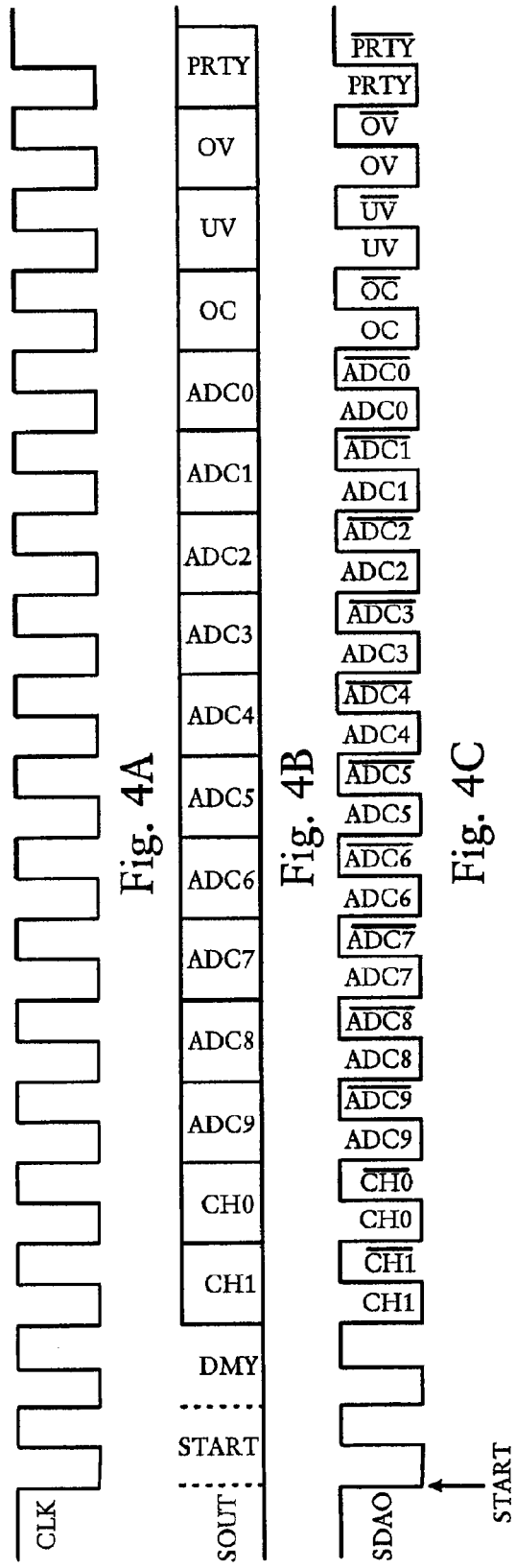

CONFIGURABLE DATA PORT FOR I2C OR SINGLE-WIRE BROADCAST INTERFACE

TECHNICAL FIELD

This disclosure relates to data communications, and more particularly, to circuitry and methodology for configuring an I²C interface to support data communications in a single-wire broadcast mode.

BACKGROUND ART

High-availability systems typically have multiple boards or cards arranged in parallel slots in a chassis or backplane. With this type of scheme, boards or cards may be removed from, and inserted into a live backplane at will. A board may have a large capacitance, and the backplane may have some inductance between the power supply and the board connector. Fast changes in current through a switch between the board and the backplane to charge a large capacitive load may cause a power droop or ringing on the backplane due to the fast change in current though the backplane inductance. This can result in undervoltage and overvoltage conditions in the boards, cards or chips on the backplane power supply line.

Each plug-in module usually has a local Hot Swap™ controller, ensuring that power is safely applied to that board during both rigorous hot-swap events, and steady-state conditions. The Hot Swap™ controller allows a board to be safely inserted to and removed from a live backplane. The Hot Swap™ controller must protect against large inrush currents, over-voltage and under-voltage faults, and backplane voltage transients.

When circuit boards are inserted into a live backplane, power supply bypass capacitors can draw a large transient current or inrush current from the power bus as they charge. A Hot Swap™ controller limits this inrush current to acceptable levels, allowing an operator to insert boards quickly and easily without having to power-down the system. Without this orderly application of load current, the board and connectors could be severely damaged and the backplane voltage may be pulled down or ring.

A Hot Swap™ device typically communicates with its system controller to provide power supply status information using a multi-wire built-in interface such as an I²C interface. The system controller may be provided on the backplane and may have a different ground level than a Hot Swap™ device.

To support data communications with such a system controller, the I²C interface contains an input-only clock port SCL and a bidirectional data port SDA split into two ports: an input data port SDAI and an output data port SDAO. The I²C bus is controlled by the system controller that acts as a bus master device and instructs a slave device when it can access the bus. Each slave has a unique address. When the master device accesses a slave, it sends the address and a read/write bit. Then, the addressed slave acknowledges the connection and the master can send or receive data to or from the slave.

An I²C bus for supporting communications between devices having different ground levels normally requires an optocoupler for each of three lines SCL, SDAI and SDAO to provide level shifting. These optocouplers are relatively expensive compared to other components of the system and increase the cost of the system. Therefore, it would be desirable to enable a customer to configure an interface to the system controller so as to reduce the number of the optocouplers required to support this interface.

SUMMARY OF THE DISCLOSURE

The present disclosure offers novel circuitry and methodology for configuring a multi-wire interface to support data communications in a single-wire mode.

In accordance with a first aspect of the disclosure, a device, such as a Hot Swap™ device, having a signal level different from a signal level of an external device, such as a system controller, comprises an interface for providing communications with the external device. For example, the device may have a different ground level or supply level than the external device. This interface is configurable to support communications with the external device either via multiple wires or via a single wire.

In accordance with an embodiment of the disclosure, the interface includes an I²C interface configurable to provide communications with the external device via a single wire. Hence, only a single optocoupler is required for providing an interface to the external device.

The interface may comprise at least one pin configurable to provide data communications either via multiple wires or via a single wire. For example, a set of address pins may be configured to select a mode of data communications. When the address pins are set in a predetermined state, data communications via a single wire may be enabled.

In accordance with another aspect of the disclosure, a device having a signal level different from a signal level of an external device includes a first interface for providing communications with the external device via multiple wires, and a second interface for providing communications with the external device via a single wire.

The first interface may include an I²C interface configurable to support communications via the second interface using a single optocoupler. The second interface may provide data transfer to the external device in a single-direction mode.

In accordance with a method of the present disclosure, the following steps are carried out in a system having first device and second device with different signal levels:
  providing interface for communicating between the first device and the second device via multiple wires, and
  configuring the interface for providing communications between the first device and the second device in a single-wire mode.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features. In the figures, like reference numerals refer to the same or similar elements.

FIG. 3 is a diagram illustrating data communications in the single-wire broadcast mode.

FIG. 4A is a timing diagram illustrating an internal clock signal for supporting data communications in the single-wire broadcast mode.

FIGS. 4B and 4C are timing diagrams illustrating a format of a data transfer carried out in the single-wire broadcast mode.

DETAILED DISCLOSURE OF THE EMBODIMENTS

The present disclosure will be made with the example of a Hot Swap™ device having a default I²C interface for communicating with a system controller. An example of such a Hot Swap™ device is the LTC®4261 Negative Voltage Hot Swap™ Controller developed by the Linear Technology Corporation, the assignee of the current subject matter. It will become apparent, however, that the concepts described herein are applicable to any device that needs to communicate with another device having a different signal level, such as a ground or supply level.

Figure 1:
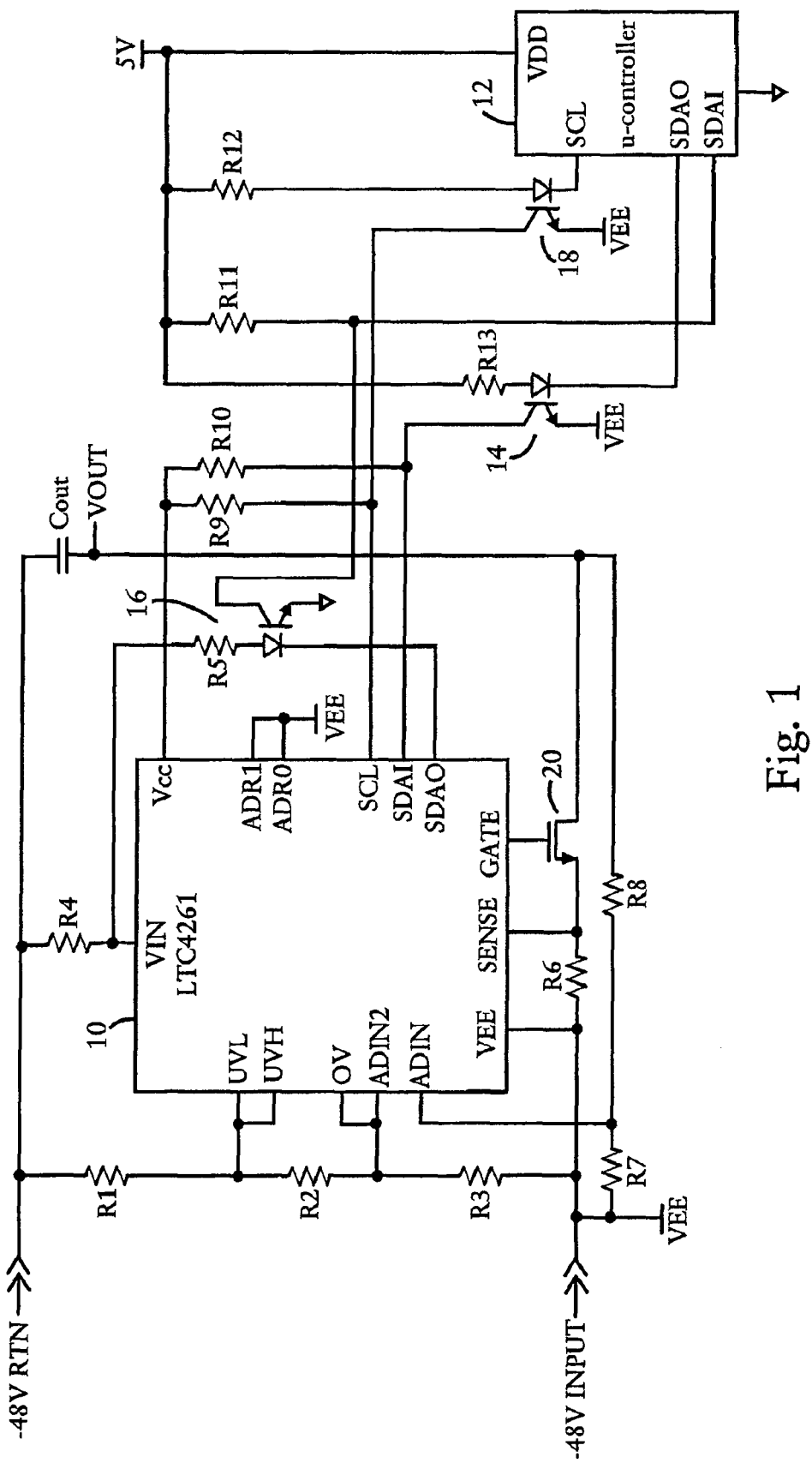
FIG. 1 is a diagram illustrating an I²C interface between a Hot Swap™ device and a system controller having different ground levels.

FIG. 1 illustrates an I²C interface between a Hot Swap™ device 10 and a system controller 12 having different ground levels. For example, the Hot Swap™ device 10 may have a ground level set at level VEE equal to −48V, whereas the system controller 12 may have a 0V ground level. The Hot Swap™ device 10 may be provided on a plug-in module, such as a circuit board or card, insertable into a backplane. The system controller 12 may be a microcontroller arranged on the backplane.

The Hot Swap™ device 10 comprises I²C data input pin SDAI, I²C data output pin SDAO, and I²C clock input pin SCL connectable to an I²C bus, which acts as a host in the I²C interface. In particularly, to provide data communications between the Hot Swap™ device 10 and the controller 12, the input pin SDAI may be coupled to the output data pin SDAO of the controller 12 via optocoupler 14, the output pin SDAO may be coupled to the input data pin SDAI of the controller 12 via optocoupler 16, and the clock input pin SCL may be coupled to the clock output pin SCL of the controller 12 via optocoupler 18. Each of the optocouplers 14, 16 and 18 provides level shifting for interfacing devices having different ground levels. Via resistors R10 and R13, the optocoupler 14 is supplied with voltages Vcc and VDD. Via resistors R5 and R11, the optocoupler 16 is provided with voltages VIN and VDD. Via resistors R9 and R12, the optocoupler 18 is supplied with voltages Vcc, and VDD. For example, the voltage VIN may be set at 11V above the ground level of the Hot Swap™ device 10, i.e. at −37V, the voltage Vcc may be set at 5V above the ground level of the Hot Swap™ device 10, i.e. at −43V, and the voltage VDD may be set at 5V above the ground level of the controller 12, i.e. at +5V.

Further, the Hot Swap™ device 10 contains three-state address pins ADDR0 and ADDR1 for selecting I²C slave addresses. Also, as discussed below, one state of the 9 available address states is used for selecting a single-wire broadcast mode. The Hot Swap™ device 10 may be configured for providing data communications with the system controller 12 in an I²C interface mode by setting the VEE potential at the pins ADDR0 and ADDR1. The I²C interface mode supports bi-directional data communications via the SDAI data input pin and the SDAO data output pin. The clock input pin SCL provides clock input from the I²C bus.

Also, the Hot Swap™ device 10 has undervoltage input pins UVH and UVL, and overvoltage input pin OV for setting low and high voltage thresholds required to detect undervoltage and overvoltage conditions. Resistors R1, R2 and R3 connect these pins to a −48V input voltage line.

Analog/digital input pins ADIN and ADIN2 are used to supply data to analog inputs of an analog-to-digital converter (ADC) provided in the Hot Swap™ device 10 for monitoring various current and voltage values. For example, the ADIN pin coupled via a voltage divider R7 and R8 between the input voltage line and an output voltage node VOUT may be used to monitor the output voltage VOUT of the Hot Swap™ device 10, and the ADIN2 may be used to sense the input voltage of the Hot Swap™ device 10.

Input pin SENSE is provided for monitoring inrush current to detect an overcurrent condition. The inrush current is supplied to N-channel MOSFET power transistor 20 connected between −48V input and output voltage node VOUT. Resistor R6 is provided to convert a value of the inrush current into a corresponding voltage value monitored by the SENSE pin. Output pin GATE drives the gate of the power transistor 20 to turn off the transistor 20 when an overcurrent condition is detected. A bypass capacitor Cout may be coupled to the output voltage node VOUT.

Power supply input pin VIN via resistor R4 is connected to a −48V return line RTN. The VIN pin may be set at +11V above the VEE level. Output pin Vcc provides voltage Vcc produced in the Hot Swap™ device 10. The Vcc voltage may be set at +5V above the VEE level.

Figure 2:
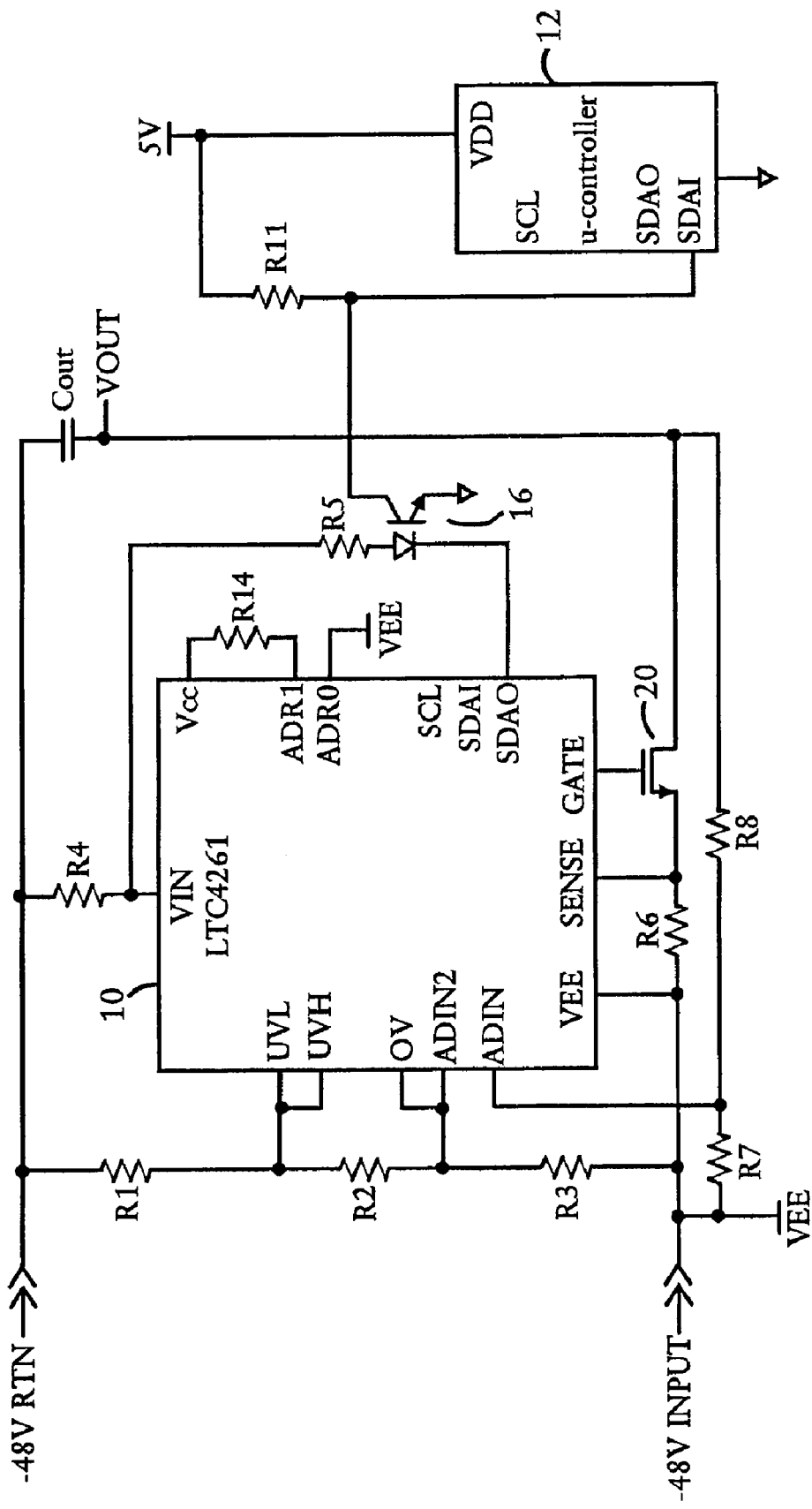
FIG. 2 is a diagram illustrating the I²C interface configured to support a single-wire broadcast mode of data communications between the Hot Swap™ device and the system controller.

FIG. 2 illustrates an interface between the Hot Swap™ device 10 and the system controller 12 configured to operate in a single-wire broadcast mode. By default, the interface may be configured to provide data communications in the I²C interface mode described above. However, three optocouplers are required to support an I²C interface between devices having different ground levels. As the optocouplers are relatively expensive compared to other components of the system, they increase the cost of the system. In accordance with the present disclosure, a user is enabled to reconfigure the Hot Swap™ device 10 from an I²C interface to a single-wire broadcast interface to reduce the number of required optocouplers from three to one.

In particular, the interface between the Hot Swap™ device 10 and the system controller 12 may be switched from the I²C interface mode to the single-wire broadcast mode by configuring the three-state address pins ADR0 and ADR1 on the Hot Swap™ device 10 so as to set these pins in a predetermined state. For example, as illustrated in FIG. 2, the pin ADR0 may be set at a low level and the pin ADR1 may be set at a high level by connecting the pin ADR0 to the VEE voltage source, and connecting the pin ADR1 to the Vcc voltage source. The resistor R14 may be selected to set a proper potential at the pin ADR1.

The single-wire broadcast mode supports data transfer from the Hot Swap™ device 10 to the system controller 12 in a single direction using the SDAO data output pin. In this mode, only one optocoupler is required for level shifting between two devices having different ground levels.

As shown in FIG. 3 that illustrates the single-wire broadcast interface, an AND gate 32 is provided in the Hot Swap™ device 10 to produce an enabling signal EN when the pins ADR0 and ADR1 are set at predetermined levels. For example, the enabling signal EN is produced when the ADR0 pin is at a high level, and the ADR1 pin is at a low level.

The enabling signal EN is supplied to a shift register 34 arranged inside the Hot Swap™ device 10. In response to the enabling signal EN, data stored in the shift register 34 are shifted out through the data output SDAO. The shift of data out of the shift register 34 is controlled by an internal clock signal CLK (FIG. 4A).

Output data SOUT shifted out of the shift register 34 are supplied to an exclusive-NOR gate 36 controlled by the internal clock signal CLK to provide Manchester encoding of the data with the internal clock CLK. A timing diagram in FIG. 4B illustrates the output data SOUT. The Manchester-encoded data drives the gate of an open-drain NMOS transistor 38 coupled to the data output pin SDAO. Via resistor R15, the transistor 38 is provided with the Vcc voltage. A timing diagram in FIG. 4C illustrates the data shifted out of the Hot Swap™ device 10 through the data output pin SDAO.

The shift register 34 may contain a start bit START and a dummy bit DMY (FIG. 4B) provided for timing calibration. These bits that may be represented by bits 0 are the first bits shifted out of the shift register 34.

The dummy bit DMY may be followed by channel label bits CH1 and CH0 that identify one of 3 channels of the analog-to-digital converter (ADC) arranged in the Hot Swap™ device 10 for monitoring various current and voltage values. For example, one channel of the ADC may relate to information on the inrush current monitored by the Hot Swap™ device 10, and the other two channels may relate to information on monitored voltages, such as the input and output voltages of the Hot Swap™ device 10.

The channel label bits CH1 and CH0 are followed by ten ADC data bits ADC[9:0] representing information monitored using the ADC. The ADC data bits are followed by three fault bits OC, UV and OV that may respectively indicate overcurrent, undervoltage and overvoltage conditions detected by the Hot Swap™ device 10. Finally, the data sequence shifted through the data output pin SDAO contains a parity bit PRTY provided to enable the system controller 12 to verify data integrity. The data sequence described above may be shifted out of the shift register at the end of each conversion cycle of the ADC.

Hence, in a single-wire broadcast mode, the Hot Swap™ device 10 is able to provide the system controller 12 with required power supply status information. While the Hot Swap™ device 10 of the present disclosure supports an I²C interface mode for data communications with the system controller 12, it enables a customer to reconfigure the I²C interface to communicate with the system controller 12 in a single-wire broadcast mode in order to reduce the cost of the system.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

In particular, the invention is not limited to an I²C interface. It may also be implemented to reconfigure other interfaces to support a single-wire mode of communications. For example, in a SPI interface, a chip select bar pin CS/ may be used to select a single-wire mode.

Further, instead of Manchester encoding, other encoding techniques may be used to encode a data sequence transferred via a single-wire interface.

Also, the invention may be implemented in an integrated circuit chip or using discrete components on a board.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A device having a signal level different from a signal level of an external device, and comprising:
    an interface for providing communications with the external device via multiple wires,
    the interface being configurable selectively to support communications with the external device either in a multiple-wire mode via the multiple wires or in a single-wire mode via a single wire,
    the interface including an address pin for providing address information when communications with the external device is performed in the multiple-wire mode,
    the address pin being configured for switching the interface between the multiple-wire mode and the single-wire mode.

2. The device of claim 1, wherein the interface includes an I2C interface configurable to provide communications with the external device via a single wire.

3. The device of claim 1, wherein the interface is configurable to provide communications with the external device via a single optocoupler.

4. The device of claim 1, wherein the external device includes a system controller.

5. The device of claim 1, wherein the interface comprises a set of address pins.

6. The device of claim 5, wherein the data communications via the single wire are enabled when the address pins are set in a predetermined state.

7. The device of claim 1, wherein the interface is configurable selectively to support communications with the external device either via the multiple wires including a clock line and a data line or via the single wire to transmit both clock and data signals.

8. A device having a signal level different from a signal level of an external device, and comprising:
    a first interface for providing communications with the external device via multiple wires in a multiple-wire mode, and
    a second interface for providing communications with the external device via a single wire in a single-wire mode,
    the first interface including an address pin for providing address information when communications with the external device is performed in the multiple-wire mode,
    the address pin being configured for switching communications from the multiple-wire mode to the single-wire mode.

9. The device of claim 8, wherein the first interface includes an I2C interface.

10. The device of claim 8, wherein the second interface is configured to provide communications with the external device via a single optocoupler.

11. The device of claim 8, wherein the second interface is configured to support data transfer to the external device in a single direction.

12. The device of claim 8, wherein the first interface comprises a set of address pins.

13. The device of claim 12, wherein the address pins are configurable to provide data communications via the second interface.

14. The device of claim 13, wherein the data communications via the second interface are enabled when the address pins are set in a predetermined state.

15. The device of claim 8, wherein the first interface is configured for providing communications with the external device via the multiple wires including a clock line and a data line, and the second interface is configured for providing communications with the external device via the single wire to transmit both clock and data signals.

16. In a system having first device and second device with different signal levels, a method of data communications between the first device and the second device comprising the steps of:
providing interface for communicating between the first device and the second device via multiple wires in a multiple-wire mode, the interface including an address pin for providing address information when communications with the external device is performed in the multiple-wire mode, and
controlling the address pin for switching communications via the interface between the multiple-wire mode and a single-wire mode.

17. The method of claim 16, wherein an I2C interface is configured for providing communications between the first device and the second device in the single-wire mode.

18. The method of claim 17, wherein address pins of the I2C interface are set to a predetermined state to enable the single-wire mode of communications between the first device and the second device.

19. The method of claim 16, wherein the first device includes a controller for controlling the second device.

20. The method of claim 16, wherein the multiple wires include a clock line and a data line, and the communications in the single-wire mode include transmission both clock and data signals over a single wire.

* * * * *